R. LIEBAU.
PNEUMATIC SPRING FOR VEHICLES.
APPLICATION FILED JAN. 21, 1908. RENEWED MAR. 9, 1910.

1,046,090.

Patented Dec. 3, 1912.

Witnesses
M. E. Jones Jr.
W. O. Blackwood

Inventor
Richard Liebau
By Blackwood Bros.
Attorneys

UNITED STATES PATENT OFFICE.

RICHARD LIEBAU, OF WATERVLIET, NEW YORK, ASSIGNOR TO THE WESTINGHOUSE AIR SPRING COMPANY, A CORPORATION OF PENNSYLVANIA.

PNEUMATIC SPRING FOR VEHICLES.

1,046,090.  Specification of Letters Patent.  Patented Dec. 3, 1912.

Application filed January 21, 1908, Serial No. 411,894. Renewed March 9, 1910. Serial No. 548,262.

*To all whom it may concern:*

Be it known that I, RICHARD LIEBAU, a citizen of the United States, residing at Watervliet, in the county of Albany, State of New York, have invented new and useful Improvements in Pneumatic Springs for Vehicles, of which the following is a specification.

My invention relates to improvements in pneumatic springs more especially for use on vehicles and has for its object to provide a spring which will automatically and uniformly regulate the amount of pressure required to sustain a load, without regard to any variations thereof, and which will effectually compensate for all shocks, jolts, jars, bumps and the like transmitted to the vehicle due principally to the unevenness and roughness of the roads.

It also has for its object to dispense entirely with packing for the piston of the spring and yet to provide a perfectly tight joint between said piston and the cylinder.

It further has for its object to provide a spring which is exceedingly simple, inexpensive and durable in construction and which will make the vehicle to which it is attached easy and comfortable to ride in.

It still further has for its object to provide a spring in which an air tight joint is established between the cylinder and the piston by expanding the piston by means of pressure.

Figure 1:
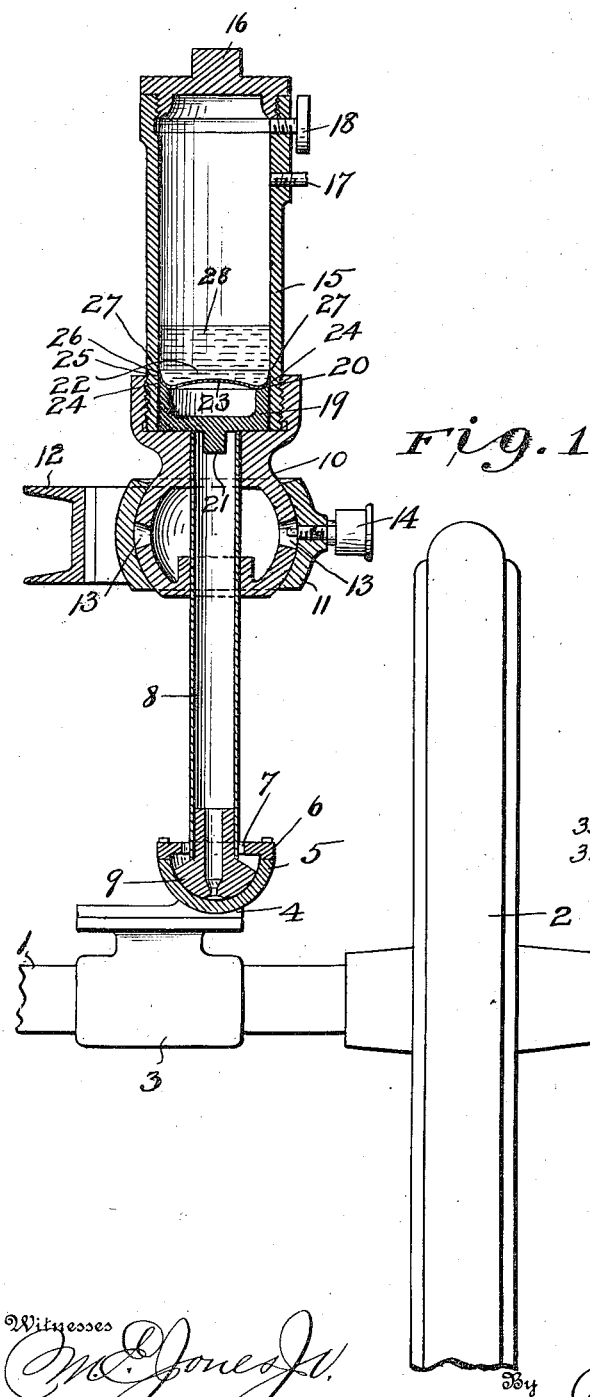
Figure 2:
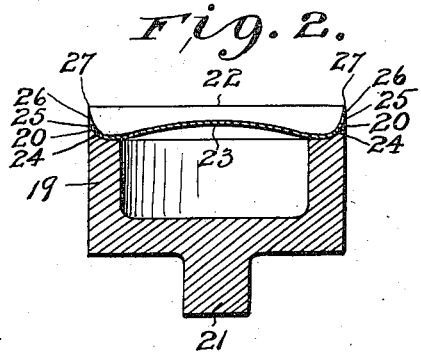
Figure 3:
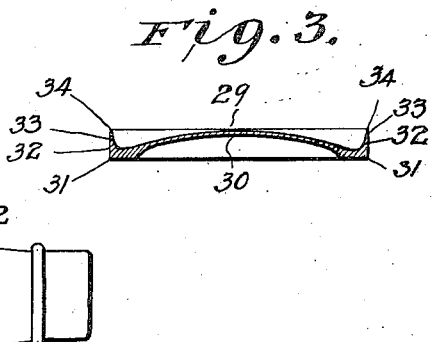

Referring to the drawings:—Figure 1 is a central vertical section. Fig. 2 a detail section of the piston. Fig. 3 a detail section of a modified form of piston.

In the drawings in which like numerals of reference denote like parts throughout the several views, 1, represents one end of an axle of a vehicle, and 2 a wheel thereon. A sleeve 3, is rigidly secured to the axle and on top of the sleeve a bracket 4, is seated having a socket 5, preferably semi-spherical in shape, and provided with a cover 6 having a circular hole 7 therethrough.

8, is a hollow piston rod, preferably filled with a lubricant, and having a ball 9 at its lower end, which is seated and turns in the socket 5, said ball having a lubricant hole therethrough by which the lubricant is supplied to the socket. Slidably mounted on the upper portion of the piston is the ball member 10, of a universal joint, which is preferably hollow and filled with a lubricant, and 11 is the socket member of said joint in which said ball member is seated and turns, said socket member 11, being mounted on the frame 12, of a vehicle and provided with lubricating holes 13, and a lubricant cup 14. An air tight cylinder 15, is screwed into the upper portion of the ball member 10, of the universal joint and is closed at its upper end by means of a screw cap or cover 16. The compressed air inlet pipe 17 is provided with a check valve, not shown, which may be of any well known form.

18, is a gage, which may also be of any well known form, by which the amount of pressure of the compressed air in the cylinder is indicated. A cup 19 is mounted on the top of the piston rod 8, and is provided with a groove 20 in its upper edge, and a lug 21 depending from its under surface which extends down into the piston rod. On the top of the cup 19, is mounted the piston 22, which comprises a shell made of thin resilient steel or other suitable material, having its middle portion 23 curved upward to form a spring, its lower edges rounded at 24, and the inner surface of its side 25, tapered as shown at 26 to a very thin edge 27. The object in having the middle portion of the shell curved upward to form a spring and having the edge of the shell tapered to a very thin edge is to make it so resilient that when liquid under pressure in said cylinder is forced against the middle portion, it will be pressed downward which will cause the edge to be pressed laterally against the inner surface of the cylinder, and the liquid will also cause the edge to be expanded and thereby a perfectly air tight joint between the piston and the cylinder will be produced.

28, indicates oil which preferably entirely fills the piston and a portion of the cylinder 15, the balance of the space above the oil being filled with compressed air. The piston being made of a single piece of thin resilient material every part of the same will be affected and expanded when the air under pressure forces the oil into the same, and the edges, being thinner than the body of the piston, will be expanded to a greater degree than the said body and will contact so intimately with the inner surface of the cylinder that it will be impossible for any fluid to pass between said edge and the cylinder.

The piston may be spun, pressed or otherwise formed into the desired shape.

In the modified form of piston shown in Fig. 3 of the drawings 29, is the piston which is provided with a middle portion 30, curved upward to form a spring, its lower edge 31, being made square and the inner surface of its side 32, tapered as shown at 33 to a very thin edge 34.

In use oil or some other comparatively incompressible fluid is first placed in the cylinder and the top or cover placed thereon then air under pressure, or some other highly compressible fluid is introduced into the cylinder through the inlet pipe 17. The oil being substantially incompressible the pressure caused by the upward movement of the piston, which in turn is caused by some obstacle in the road coming in contact with the wheel of the vehicle, is at once transmitted to the oil or other liquid and forces said oil into the piston and the piston being made of thin resilient material, the middle portion is pressed downward, which in connection with the pressure of the liquid against the edge expands the edge and makes a liquid and air tight joint between the inner surface of the piston and the cylinder. As soon as the excess of pressure is removed the elasticity of the air will restore the piston to its normal position. As the springs take up or compensate for all shocks, jolts, &c., transmitted to the vehicle solid rubber tires, or any other may be used thus obviating the use of pneumatic tires.

I do not desire to be understood as limiting myself to the specific details of construction and arrangement as herein described and illustrated, as it is manifest that variations and modifications may be made in the features of construction and arrangement, on the adaptation of the device to various conditions of use without departing from the spirit and scope of my invention and improvements. I therefore reserve the right to all such variations and modifications as properly fall within the scope of my invention and the terms of the following claims.

What I claim is:—

1. A pneumatic spring for vehicles, comprising a cylinder, a piston of resilient material having a spring middle portion and edges, said edges being of a greater degree of resiliency than the middle portion thereof, substantially as described.

2. A pneumatic spring for vehicles comprising a cylinder, a piston of resilient material having an upwardly curved spring middle portion, and sides which taper and form a thin edge, substantially as described.

3. A pneumatic spring for vehicles, comprising a cylinder, a piston of resilient material having sides which taper and form an edge thereon and a spring middle portion which when pressed upon causes said sides to be pressed against the inner surface of said cylinder to form a tight joint, substantially as described.

4. A pneumatic spring for vehicles, comprising a cylinder, a hollow piston of resilient material having a thin edge and a middle portion, which when pressed upon causes said edge to be expanded, substantially as described.

5. A pneumatic spring for vehicles, comprising a cylinder designed to contain liquids under pressure, a piston of resilient material having a thin edge, and a spring middle portion designed to expand said edge and a support for said piston having a hollow portion under said piston, substantially as described.

6. A pneumatic spring for vehicles, comprising a cylinder, a piston having its middle portion curved to form a spring, its lower edges rounded, and the inner surface of its side tapered to a thin edge, substantially as described.

7. In a pneumatic spring for vehicles, a piston having a spring middle portion which when pressed upon causes the edge of the said piston to be pressed against the inner surface of the cylinder or other receptacle in which it is placed, substantially as described.

In testimony whereof I have signed my name in the presence of two subscribing witnesses.

RICHARD LIEBAU.

Witnesses:
PHILIP F. LARNER,
JAS. H. BLACKWOOD.